United States Patent [19]

Bauer et al.

[11] 4,251,371
[45] Feb. 17, 1981

[54] DEVICE FOR THE BIOLOGICAL PURIFICATION OF WASTE WATER

[75] Inventors: Alexander Bauer, Kelkheim; Gerhard Leistner, Schmitten; Gerhard Müller, Kelkheim; Günther Sell, Hattersheim am Main, all of Fed. Rep. of Germany

[73] Assignee: Hoechst Aktiengesellschaft, Frankfurt, Fed. Rep. of Germany

[21] Appl. No.: 10,536

[22] Filed: Feb. 8, 1979

[30] Foreign Application Priority Data

Feb. 11, 1978 [DE] Fed. Rep. of Germany ....... 2805794

[51] Int. Cl.³ .............................................. C02F 3/22
[52] U.S. Cl. .................................. 210/197; 210/208; 210/219; 210/256
[58] Field of Search ................. 210/14, 197, 205–208, 210/209, 218, 219, 256, 260

[56] References Cited

U.S. PATENT DOCUMENTS

| | | | |
|---|---|---|---|
| 3,043,433 | 7/1962 | Singer | 210/197 |
| 3,439,807 | 4/1969 | Danjes | 210/197 |
| 4,100,071 | 7/1978 | Beurer et al. | 210/197 X |

Primary Examiner—Thomas G. Wyse
Attorney, Agent, or Firm—Curtis, Morris & Safford

[57] ABSTRACT

A device for the biological purification of waste water and for the degasification and clarification of a sludge-water mixture resulting from the biological purification includes a reactor container defining a chamber, means for introducing air, waste water and activated sludge into the chamber and means for discharging overflowing sludge-water mixture from the reactor container (activation chamber). A guide element is disposed within the chamber for maintaining a loop-shaped flow therein. A section of the wall of the reactor container is surrounded by a jacket, the lower end of which is joined to the periphery of the wall of the reactor container intermediate its ends and the upper end of which is substantially concentric to and spaced outwardly from the container; the lower portion of the jacket may have an inverted frusto-conical configuration; the jacket defines with the reactor container an annular space around the container, a portion of said space being adapted for settling of sludge out of the sludge-water mixture overflow. An inlet element and a discharge trough are arranged about the reactor container. The overflow from the reactor container discharges into the inlet element and passes via outlet means to the settling portion of said annular space, wherein sludge separates from effluent of the sludge-water mixture. Effluent from the mixture passes into the discharge trough for removal via another outlet means from the apparatus.

9 Claims, 1 Drawing Figure

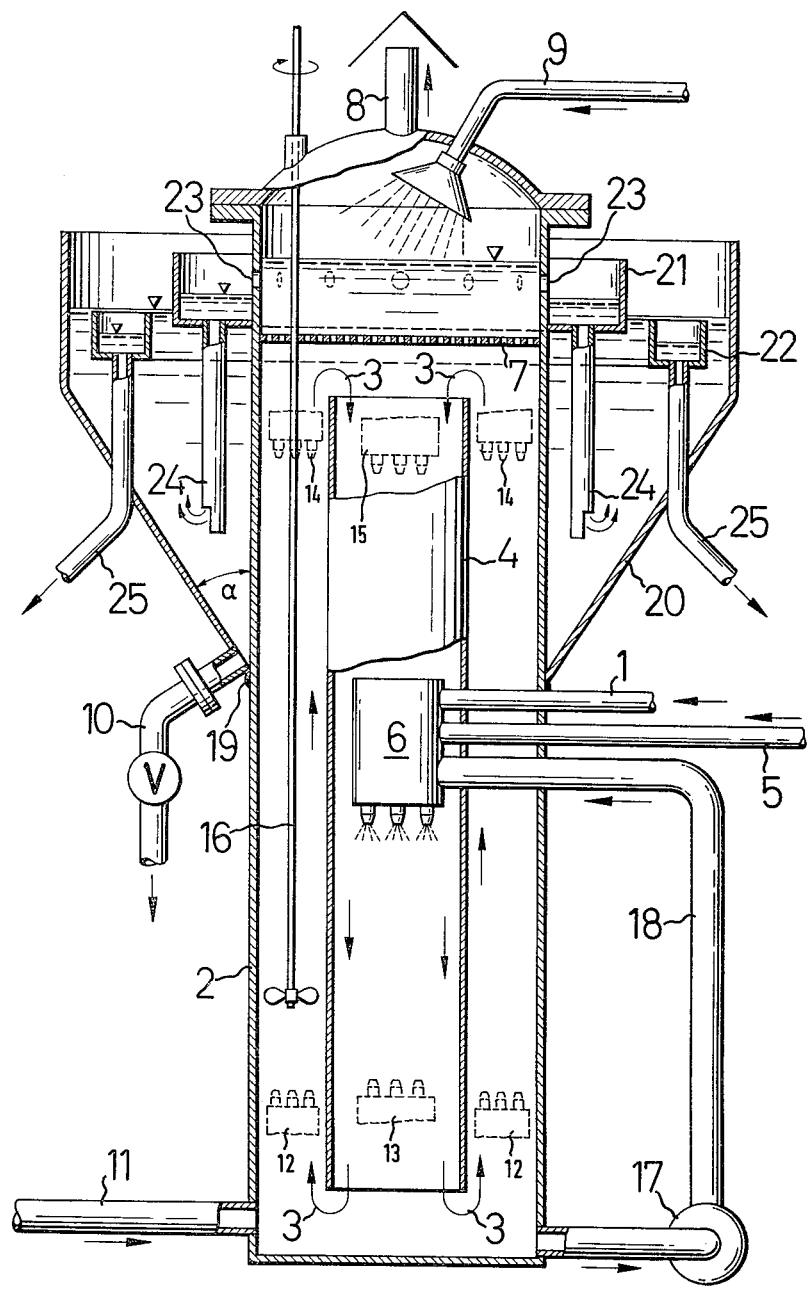

DEVICE FOR THE BIOLOGICAL PURIFICATION OF WASTE WATER

The subject of the present invention is a device for the biological purification of waste water and for degassing and clarifying sludge-water mixtures resulting from the biological purification step.

The use of high cylindrical towers of the bubble column type for the biological purification of waste water is known. These towers are provided with funnel-shaped containers at their upper edges for the sedimentation of the sludge. However, the exchange of material is not very efficient owing to the lack of inserts. Moreover, the use of affixed funnel-shaped receptacles requires particularly expensive construction measures.

It is an object of the invention to develop a cost- and space-saving device with particularly efficient exchange of material for the biological purification of water water.

The present invention, therefore, provides a device characterized in that
(a) a guide element is disposed in a reactor for maintaining a loop shape movement of the contents of the reactor;
(b) the reactor is provided with a jacket, the lower end of which is fastened to the wall of the reactor and which jacket enlarges upwardly so as to form a conical annular space around the reactor,
(c) an inlet element and an outlet trough are arranged in the conical annular space concentrically to the reactor,
(d) the overflow pipes of the reactor open into the inlet element.

The guide element may be a tube, the cross-section of which is 0.1 to 0.7 times the cross-section of the reactor. The guide element may be composed of 1 to 15 tubes. The length of the guide element should be 50 to 90% of the level of the sludge-water mixture in the reactor. The jacket may be inclined such that is forms an angle of 10° to 60° with the reactor wall. The bottom part of the annular area is suitably provided with closable openings for periodically discharging the sludge. The openings are surrounded by inserts for guiding the sludge in a manner such that dead zones in this part of the annular area are avoided.

The invention will be illustrated by way of example in the accompanying FIGURE showing a vertical sectional view of the device and in the description referring to the FIGURE.

Referring to the FIGURE: A reactor 2, the activation chamber, is provided with a conduit 1 for admitting the waste water (crude water), a conduit 5 for introducing the air and a conduit 11 for admitting activated sludge. A guide element 4, which may consist of 1 to 15 tubes, depending on its size, is arranged in the activation chamber. For reasons of clearness, only one tube as guide element is shown in the FIGURE. The lines 3 allude to the loop shape movement of the sludge-water mixture.

It can be seen from the FIGURE that the mixture descends in the guide element 4. However, alternatively an inverse direction of flow is possible. The air distribution element 6, which may be made up of static mixers, frits or injectors (mixing nozzles) may on principle be arranged such that air may be introduced into the activation chamber at any desired position. Some alternative arrangements are represented by the elements 12 to 15 (shown in phantom). When introducing the air into the descending mixture contrary to the lifting forces acting on the gas, the mixture is suitably kept in motion by additional mechanical energy, for example by means of a stirrer 16 or by means of a sludge-water mixture circuit 18 moved by a pump 17. In that event the mixture is discharged, preferably from the bottom part of the reactor, and is re-introduced into the reactor near the air inlet.

The reactor 2 is surrounded by a jacket 20, the lower end 19 of which is fastened to the reactor and which jacket enlarges upwardly so as to form a conical annular space. The angle which the jacket forms with the reactor 2 may be in the range from 10° to 60°. A trough 21 and a trough 22 are arranged concentrically to the reactor in the conical annular space. Trough 21, which is connected with the activation chamber by overflow pipes 23, receives the sludge-water mixture. In may be provided with falling film zones, cascades or mechanical gas expellers for degassing the sludge-water mixture. The degassed mixture passes from trough 21 through pipes 24 into the annular space. The sludge settles in the bottom part of this space, whereas the water it collected in trough 22, from which is may be discharged through conduit 25. The bottom part of the annular space is provided with closable openings 10 through which the sludge may be discharged. Inserts may be arranged in the bottom part between adjacent openings (not shown in the FIGURE) in order to avoid dead zones which would impair the discharge of the sludge. The inserts may be slopings, cones and the like.

The mixture is advantageously submitted to an after-treatment. For this purpose a perforated plate 7 or similar devices may be arranged in the reactor at a certain level above the guide element 4. By this arrangement backmixing with the mixture in loop shape motion is avoided. At the top of the reactor a shower may be mounted for killing foams, if any is desired. The off-air is withdrawn via conduit 8.

EXAMPLE

There is used a reactor 20 m in height and 5 m in diameter. The annular space has a maximum diameter of 11 m and a height of 6.5 m. In the activation chamber of the reactor there is disposed a guide tube 16 m in height and 2.8 m in diameter. The level of the sludge-water mixture is 18 m. The air and the waste water (crude water) each is introduced into the mixture which is flowing downwardly and kept in loop shape motion at a level 9 m below the level of the mixture. Activated sludge is introduced into the activation chamber in its bottom portion. The sludge-water mixture is discharged from the reactor at the height of the liquid level and is introduced into the annular space.

The reactor is charged per hour with 60 m$^3$ of waste water having a BOD$_5$ value of 1200 mg/l, 510 Nm$^3$ of air and 60 m$^3$ of activated sludge. The activated sludge is discharged from the annular space.

The temperature in the reactor is 20° C.

The sludge concentration of the mixture leaving the reactor is 4 g/l, that of the activated sludge (return sludge) 8 g/l and that of the clear runnings (water leaving the annular area) 20 mg/l.

The clear runnings have a BOD$_5$ value of from 30 to 50 mg/l.

What is claimed is:
1. An apparatus for the biological purification of waste water and for the degasification and clarification of a sludge-water mixture resulting from said purification, including:

a cylindrical reactor container defining a chamber therein;

means for introducing the waste water into said chamber;

means for introducing air into the chamber;

means for introducing activated sludge into the chamber;

a jacket having an upper portion and a lower portion, said upper portion being cylindrical and concentrically enclosing a portion of said container and said lower portion being of an inverted frusto-conical configuration, said jacket being sealingly joined at its lower end to the periphery of the container at a location intermediate the ends of the container, and said jacket defining with said container an annular space therebetween a portion of which is adapted for the settling of sludge from a sludge-water mixture occupying the space;

a guide element disposed within said chamber and adapted for including a loop-shaped flow in sludge-water mixture in the chamber;

an inlet trough disposed concentrically about said container in the annular space;

first outlet means for discharging sludge-water mixture from said chamber into said inlet trough;

second outlet means for discharging, sludge-water mixture from said first trough into the settling portion of the annular space, wherein sludge from said mixture settles toward the bottom of said space thereby separating from the effluent of said mixture;

an outlet trough disposed concentrically about said container in the annular space at a level intermediate the level of said first trough and the level at which the discharge from the first trough enters the settling portion of said space, and adapted for receiving said effluent;

third outlet means for discharging effluent from said outlet trough to a location outside said apparatus.

2. An apparatus for the biological purification of waste water and for the degasification and clarification of a sludge-water mixture resulting from said purification, including:

a reactor container defining a chamber;

means for introducing the waste water into the chamber;

means for introducing air into the chamber;

means for introducing activated sludge into the chamber;

a jacket, surrounding a portion of said reactor container, being sealingly joined at its lower end to the periphery of the container at a location intermediate the ends of the container and being at its upper end substantially concentric to and spaced outwardly from the container, said jacket defining with said container an annular space therebetween a portion of which is adapted for settling of sludge from a sludge-water mixture occupying said space;

a guide element disposed within said chamber and adapted for inducing a loop-shaped flow in sludge-water mixture in the chamber;

an inlet element disposed about said container in the annular space and adapted for receiving sludge-water mixture from said chamber;

means for introducing sludge-water mixture from said chamber into the inlet element;

means for discharging sludge-water mixture from said inlet element into the settling portion of said annular space wherein sludge from the mixture settles toward the bottom of said space thereby separating from the effluent of said mixture;

an outlet trough disposed about said reactor container in the annular space and adapted to receive said effluent; and means for discharging effluent from said trough to a location outside said apparatus.

3. An apparatus as defined in claim 1 or 2, wherein the guide element is a tube the cross-section of which is 0.1 to 0.7 times the cross-section of the reactor container.

4. An apparatus as defined in claim 1 or 2, wherein the guide element comprises from 1 to 15 tubes.

5. An apparatus as defined in claim 1 or 2, wherein the length of the guide element is from 30 to 90% of the level of the sludge-water mixture in the reactor container.

6. An apparatus as defined in claim 1 or 2, wherein said lower portion of the jacket forms an angle of from 10° to 60° with the reactor container.

7. An apparatus as defined in claim 1 or 2, which further includes fourth outlet means for discharging sludge from said annular space and inserts disposed within said settling portion of the annular space and operatively associated with said fourth outlet means for guiding sludge toward said means.

8. An apparatus as defined in claim 7, wherein said fourth outlet means comprises a plurality of openings operatively associated with means for closing same.

9. An apparatus as defined in claim 1 or 2, wherein a perforated partition is disposed within said chamber at a level intermediate the upper end of said guide element and said first outlet means and adapted for preventing the return to the portion of the chamber containing the guide element of sludge-water mixture traversing the chamber.

* * * * *